United States Patent [19]

Andrews et al.

[11] Patent Number: 5,546,452
[45] Date of Patent: Aug. 13, 1996

[54] COMMUNICATIONS SYSTEM USING A CENTRAL CONTROLLER TO CONTROL AT LEAST ONE NETWORK AND AGENT SYSTEM

[75] Inventors: G. Wayne Andrews, Amherst, N.H.; Steven H. Webber, Groton, Mass.; James P. Kelly, Newbury, Mass.; Lawrence E. Johnson; Jerry A. Stern, both of Sudbury, Mass.; Vincent J. Milano, Jr., Westwood, Mass.; Charles R. Davis, Stow, Mass.

[73] Assignee: GeoTel Communications Corp., Littleton, Mass.

[21] Appl. No.: 398,950

[22] Filed: Mar. 2, 1995

[51] Int. Cl.⁶ .................................................. H04M 7/06
[52] U.S. Cl. ........................ 379/219; 379/265; 379/279; 379/269; 379/201
[58] Field of Search ........................ 379/201, 220, 379/221, 219, 279, 265, 267, 269, 112, 207, 202, 214, 157, 88, 89

[56] References Cited

U.S. PATENT DOCUMENTS

| | | | |
|---|---|---|---|
| 4,289,934 | 9/1981 | Pitroda et al. | 379/265 |
| 4,466,098 | 8/1984 | Southard | 379/279 |
| 4,674,036 | 6/1987 | Conforti | 379/279 |
| 4,700,381 | 10/1987 | Eher | 379/279 |
| 4,737,983 | 4/1988 | Frauenthal et al. | 379/221 |
| 4,755,995 | 7/1988 | Anderson et al. | 379/279 |
| 4,866,763 | 9/1989 | Cooper et al. | 379/221 |
| 4,881,261 | 11/1989 | Oliphant et al. | 379/309 |
| 4,951,310 | 8/1990 | Honda et al. | 379/266 |
| 4,988,209 | 1/1991 | Davidson et al. | 370/58.2 |
| 5,023,868 | 6/1991 | Davidson et al. | 370/62 |
| 5,031,211 | 7/1991 | Nagai et al. | 379/225 |
| 5,036,535 | 7/1991 | Gechter et al. | 379/210 |
| 5,062,103 | 10/1991 | Davidson et al. | 370/58.1 |
| 5,073,890 | 12/1991 | Danielsen | 379/265 |
| 5,113,430 | 5/1992 | Richardson, Jr. et al. | 379/88 |
| 5,153,909 | 10/1992 | Beckle et al. | 379/266 |
| 5,175,866 | 12/1992 | Childress et al. | 379/279 |
| 5,193,110 | 3/1993 | Jones et al. | 379/94 |
| 5,214,688 | 5/1993 | Szlam et al. | 379/112 |
| 5,271,058 | 12/1993 | Andrews et al. | 379/265 |
| 5,291,492 | 3/1994 | Andrews et al. | 379/157 |
| 5,291,550 | 3/1994 | Levy et al. | 379/221 |
| 5,291,551 | 3/1994 | Conn et al. | 379/265 |
| 5,309,505 | 5/1994 | Szlam et al. | 379/214 |
| 5,309,513 | 5/1994 | Rose | 379/265 |
| 5,317,627 | 5/1994 | Richardson, Jr. et al. | 379/207 |
| 5,335,268 | 8/1994 | Kelly, Jr. et al. | 379/112 |
| 5,335,269 | 8/1994 | Steinlicht | 379/265 |
| 5,341,374 | 8/1994 | Lewen et al. | 379/202 |
| 5,353,339 | 10/1994 | Scobee | 379/221 |
| 5,355,403 | 10/1994 | Richardson, Jr. et al. | 379/112 |
| 5,392,345 | 2/1995 | Otto | 379/265 |
| 5,392,346 | 2/1995 | Hassler et al. | 379/265 |
| 5,402,474 | 3/1995 | Miller et al. | 379/267 |
| 5,404,350 | 4/1995 | Devito et al. | 379/221 |
| 5,450,482 | 9/1995 | Chen et al. | 379/265 |
| 5,452,350 | 9/1995 | Reynolds et al. | 379/265 |
| 5,459,780 | 10/1995 | Sand | 379/265 |

*Primary Examiner*—Jeffery Hofsass
*Assistant Examiner*—Scott Wolinsky
*Attorney, Agent, or Firm*—Hayes, Soloway, Hennessey, Grossman & Hage

[57] ABSTRACT

A communications system and method for automatically making telephone routing decisions with "global authority" based upon information gathered in real time from the entire communications system and global optimization criteria. The present invention permits unified central control and management for the entire system.

72 Claims, 9 Drawing Sheets

COMMUNICATIONS SYSTEM USING A CENTRAL CONTROLLER TO CONTROL AT LEAST ONE NETWORK AND AGENT SYSTEM

BACKGROUND OF THE INVENTION

1. Field of the Invention

The present invention relates generally to a communications system and method for operating same. More specifically, the present invention relates to a distributed, fault-tolerant communications system and method for operating same that makes real-time, call routing decisions based upon system-wide resource utilization preferences and information. Particular utility for the present invention is found in the area of call distribution through a public network (e.g., a public telephone network) to and through agent systems having a plurality of diverse individual workgroups and caller services (e.g., interactive voice response and/or voice mail systems), although other utilities are also contemplated.

2. Brief Description Of Related Prior Art

Systems for routing calls through public or private communications networks are known in the art. Conventional automatic call distribution (ACD) systems route calls to agents in telemarketing and service inquiry centers, and provide limited real-time call management and reporting capabilities. A typical ACD system will monitor the status of the agent and, when an incoming call is received, selects the agent to handle a particular service request. Reporting and performance data from the agents are also generated by the ACD.

One particular type of scheme for distributing calls to agents is disclosed in Frauenthal et al., U.S. Pat. No. 4,737,983. According to Frauenthal et al., data representing the present call congestion of each of the ACD systems is accumulated in a data base. Using the data in the data base, the percentage of calls made to the ACD systems, as a group, is determined. The information is then used to generate call routing information. When a new call is made to the central office, the routing information is queried to determine which of the ACD systems is to receive the call, so as to balance the call traffic load across the ACD systems.

Another call distribution scheme is provided in Gechter et al., U.S. Pat. No. 5,036,535. This patent discloses a system for automatically distributing telephone calls placed over a network to one of a plurality of agent stations connected to the network via service interfaces, and providing status messages to the network. Gechter et al.'s disclosed system includes means for receiving the agent status messages and call arrival messages from the network, which means are connected via a network service interface to the network. Routing means responsive to the receiving means is provided for generating a routing signal provided to the network to connect the incoming call to an agent station through the network. In the system disclosed in Gechter et al., when an incoming call is made to the call router, it decides which agent station should receive the call, establishes a call with that agent station, and then transfers the original call onto the second call to connect the incoming caller directly to the agent station and then drops out of the connection. (See, Gechter et al., column 11, lines 45–51).

U.S. Pat. No. 5,193,110 issued to Jones et al. discloses an integrated services platform for a telephone communications system, which platform includes a plurality of application processing ports for providing different types of information services to callers. In Jones et al.'s disclosed system, a master control unit and a high speed digital switch are used to control processing of incoming phone calls by recognizing the type of service requested by the caller and then routing the call to the appropriate processing port. The Jones et al. system is disclosed as an adjunct to current switching technology in public and private networks.

Another call routing system is the Enhanced 800 Service provided by AT&T. Enhanced 800 Service allow calling customers to split call and direct them to multiple call centers. Unfortunately, among its many disadvantages, this system is predicated upon the notion that system dynamics are relatively static (i.e., that call volumes do not change drastically and that proper system functioning is a "given"). However, given the dynamics of the modern telecommunications market, this notion is often very wrong.

Unfortunately, none of the aforesaid prior art systems discloses integrated means for controlling both the routing of calls to the agent and/or caller service systems, operation of the agent and/or caller service systems themselves, and the various management and administration functions (e.g., compilation and updating of call management, preferences, and status information databases, and inputting of user control preferences) since no single ("global") controller completely controls processing and distribution of all calls throughout the system, and administrative functions. Thus, disadvantageously, the prior art fails to provide means for optimally utilizing system resources according to unified optimization criteria. Additionally, the prior art fails to provide adequate means for preventing catostrophic system failure in the event of controller malfunction and/or failure of other important elements of the system.

SUMMARY OF THE INVENTION

Accordingly, the present invention provides a communications system (and method for operating same) having integrated central control of both the routing of calls to the agent and/or caller service systems, the operation of the agent and/or caller service system themselves, and administrative functions. Advantageously, the system and method of present invention permit a single central controller to completely control all distribution of calls throughout the entire network (i.e., even in and through separate agent and caller service systems). This permits all of the resources of the system to be allocated according to unified optimization criteria so as to permit optimal system resource utilization. Also advantageously, the present invention permits truly global (i.e., system-wide) administration and control.

Additionally, in preferred embodiments of the present invention, the system provides enhanced routing capabilities by collecting from the network caller information such as dialed number, calling line ID, and caller entered digits. In such preferred embodiments, prior to connection of the call to its ultimate termination point, the system uses the caller-entered digits, calling line ID and other system information to formulate a routing command back to the public network. The routing command may cause the network to deliver the physical call to the call termination point along with DNIS or system information carried in the user-to-user field of the ISDN setup message. Advantageously, this permits explicit control of the interexchange carriers connecting the call to the target termination, based upon a diverse set of criteria, including caller accounts and personal ID numbers.

One preferred embodiment of the system of the present invention essentially comprises a plurality of public networks for interconnecting a plurality of calls to a plurality of respective agent systems. Each of the agent systems includes a plurality of workgroups. The system also comprises up to two central controllers for generating control signals to control the public networks and the agent systems to optimally route the calls through the networks and the agent systems to certain of the workgroups. The central controllers are adapted to generate the control signals based upon status messages received from the agent systems, requested service data from the network, and optimization parameters. The central controllers include both a primary central controller and a redundant central controller, which is for controlling the system in the event of failure of the primary central controller. The central controllers may be geographically separated from each other. The system also includes synchronizer means for virtually synchronizing respective internal states of the central controllers, and interfacing means for interfacing the central controllers to the public networks and means for interfacing the central controllers to the agent systems.

It will be appreciated by those skilled in the art that although the following Detailed Description will proceed with reference being made to preferred embodiments and methods of use, the present invention is not intended to be limited to these preferred embodiments and methods of use. Rather, the present invention is of broad scope and is intended to be limited only set forth in the accompanying claims.

Other features and advantages of the present invention will become apparent as the following Detailed Description proceeds, and upon reference to the Drawings, wherein like numerals depict like parts, and wherein:

DETAILED DESCRIPTION OF PREFERRED EMBODIMENTS

Figure 1:
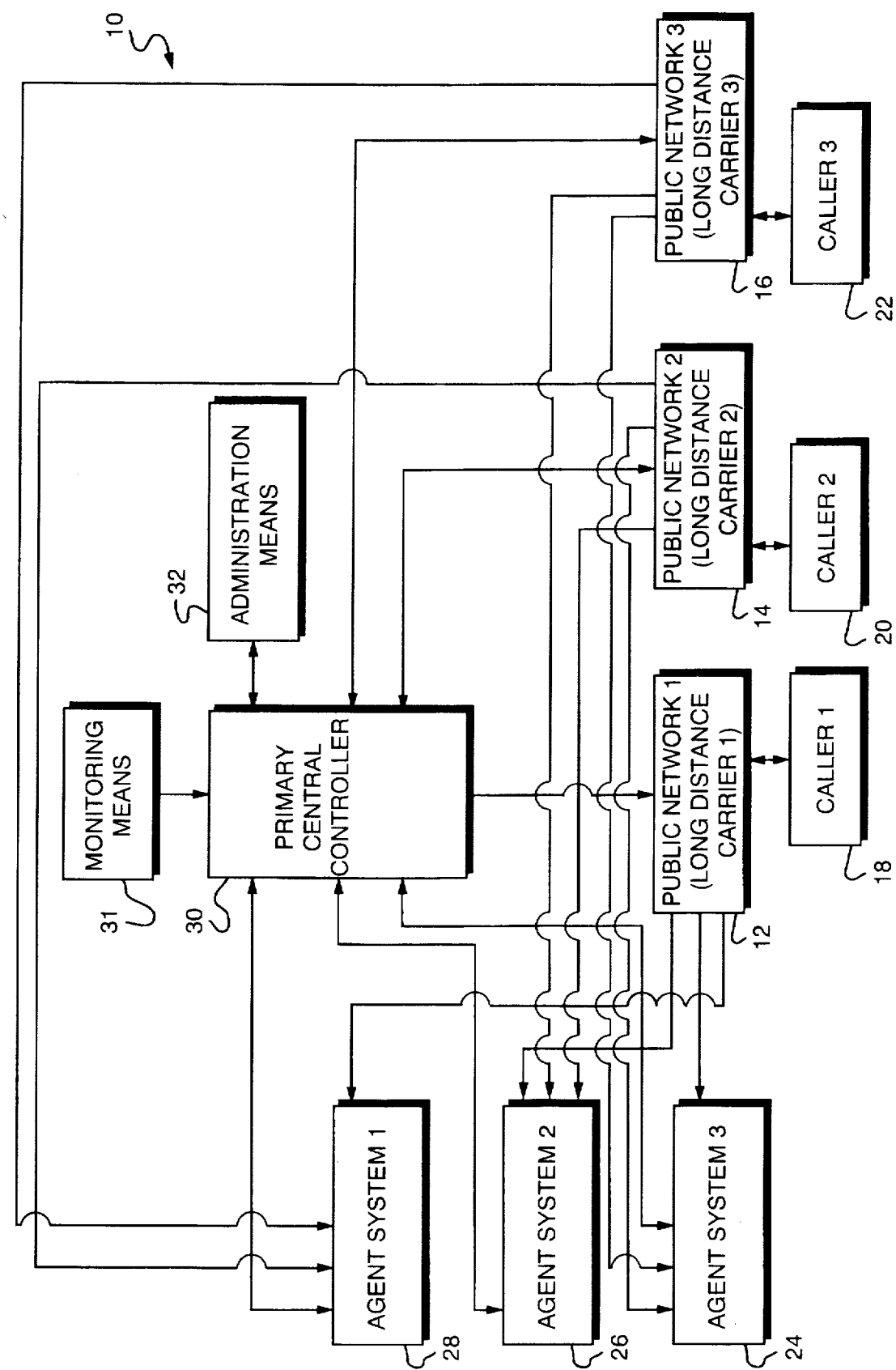
FIG. 1 is a functional block diagram of a preferred embodiment of the present invention.

FIG. 1 is an architectural-level block diagram of the various functional components of one preferred embodiment 10 of the system of the present invention. System 10 includes at least one 24, and preferably a plurality of agent systems 24, 26, 28 connected to a primary central controller 30 and at least one 12, and preferably a plurality of conventional public telephone and/or long distance carrier networks (e.g., MCI, Sprint, AT&T) 12, 14, 16. Callers 18, 20, 22 place calls to the agent systems 24, 26, 28 via public networks 12, 14, 16. As will be explained more fully below, primary central controller 30 generates control signals for controlling distribution of calls through the long distance carriers to the agent systems, and through the agent systems themselves to individual workgroups, customer agents and/or caller services, based upon requested service data (e.g., telephone numbers and other information) supplied by callers through the public networks, status messages (i.e., availability of resources for use by callers, loading of system resources, etc.) supplied by the agent systems, and optimization parameters (i.e., user supplied criteria for the system is to balance competing concernings for use of system resources) stored in controller 30. Administration means 32 permits user access and control of the system 10 by, for example, permitting dynamic changing of optimization parameters, system configuration data, etc. stored in controller 30. Monitoring means 31 monitors the various elements of the system (i.e., the agent systems 24, 26, 28, administration means 32, etc.) to determine whether these elements are functioning properly. If a malfunction is detected, that fact is signaled to the central controller 30, so that it can undertake appropriate action to correct and/or eliminate the malfunction and/or any resulting problems to the system 10 from the malfunction.

It is important to note at the outset that, although not shown in the Figures, each of the conventional long distance carriers 12, 14, 16 includes a long distance control network (e.g., AT&T's Signaling System 7 (SS7) control network, MCI's TCP/IP-based control network, Sprint's X.25-based control network, and/or foreign telecommunication's CCITT SS7-based control network) and local exchange carriers. The long distance control networks control routing of calls through the long distance network serviced by the exchange carriers. When a long distance call request is received (e.g., a caller dials a long distance telephone number) by the exchange carrier, it forwards the call to the long distance network, which routes the call to its intended destination. In accordance with the present invention, the long distance control network is programmed such that when the long distance control network receives a request for long distance connection to one of the agent systems 24, 26, 28 (or, as will be explained more fully below, to one of the agent's systems workgroups or caller services), the long distance control network forwards the long distance routing request to the central controller 30. The central controller then processes the request and controls the system 10 to optimally utilize the system's resources (i.e., to minimize calling cost by routing the call along the lowest cost route, to balance system loading by routing the call to the resource with the lowest current load, to maximize call localization by routing the call to the resource closest to its origination point, or to use a combination of the foregoing and such other techniques), in the manner described more fully below. As used herein, the system's "resources" include its agent systems, caller services, and/or individual agent workgroups. As will be seen, the system accomplishes call routing by, inter alia, translating the routing request message into a route response message for addressing the desired agent system.

Figure 2:
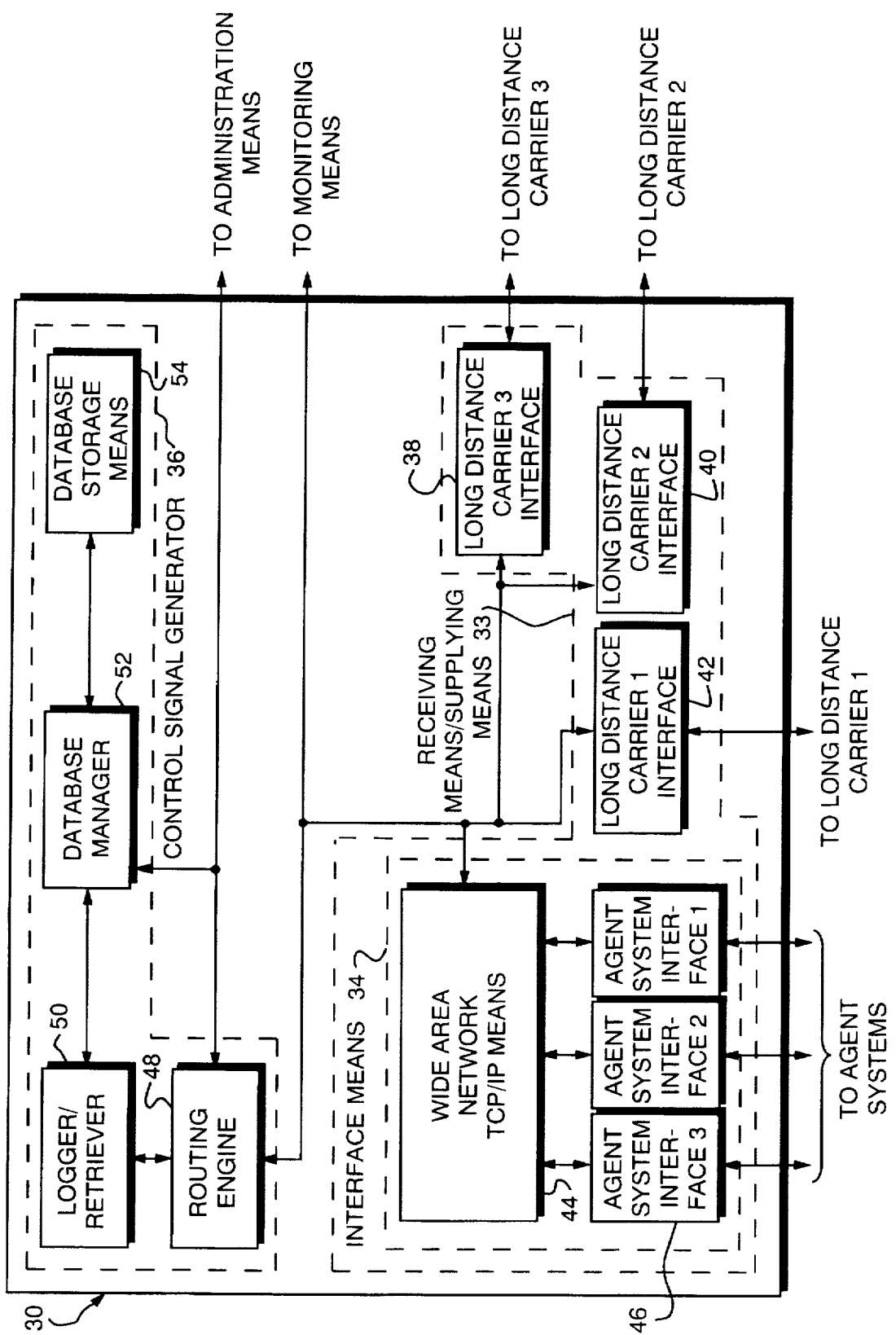
FIG. 2 is a functional block diagram of the primary central controller of the preferred embodiment of FIG. 1.

FIG. 2 is a schematic block diagram of the various functional components of the central controller 30. Controller 30 includes means 33 for receiving status messages and caller service requests, and for supplying control signals generated by the controller 30 to the public networks and the agent systems. Receiving and supplying means 33 includes long distance carrier interfaces 38, 40, 42 for interfacing the controller 30 to the public networks 12, 14, 16, respectively, each of which interfaces is appropriately adapted to permit transmission of control signals and receipt of caller service requests from the respective network to which it is connected. For example, if carrier interface 42 is connected to an AT&T SS7 network, then it is appropriately configured to permit transfer of control signals and service requests between the controller 30 and the SS7 network. Other types of carriers must also be similarly accommodated by appropriately configuring the other interfaces 40, 38 to permit exchange of such data between these networks and the controller 32.

Receiving and supplying means 33 also includes agent interface means 34 for interfacing the controller 30 to the agent systems 24, 26, 28. Preferably, interface means 34 includes agent systems interfaces 46 connected to conventional wide area network means 44. Wide area network 44 connects the controller to the interface means whereby to permit transmission of status messages from the agent systems to the controller, and to permit transmission of control signals to the agent systems. It should be understood that the particular types of interfaces 46 used will depend upon the particular constructions of the agent systems, the wide area network, and the controller. Wide area network 44 preferably is of the TCP/IP (Transmission Control Protocol/ Internet Protocol) type, although if system 10 is appropriately modified other types of conventional network means may be used to construct network 44 without departing from this embodiment of the instant invention.

Also shown in FIG. 2 is the control signal generator means 36, which is connected to the receiving and supplying means 33, monitoring means 31, and administrative means 32. Control signal generating means 36 comprises routing engine 48, database logger/retrieving means 50, database manager means 52, database storage means 54. Preferably, routing engine 48 determines how to optimally route calls in the system 10 (i.e., through the public networks to the agent systems, and in the agent systems themselves), and transmits this routing information (in the form of appropriate control signals, such as routing response messages for addressing the desired end-termination (i.e., workgroup/ caller service) in the system to interface means 34 and receiving/supplying means 33 for transmission to the agent systems and long distance control networks, respectively. In order to determine how best to route calls in the system, routing engine 48 takes into consideration real-time requested service data supplied to it by the receiving and supplying means 33, historical (i.e., previously stored) requested service data retrieved by logger/retriever means 50 at the command of the routing engine 48 from the system's historical database (comprising database manager 52 and storage means 54), real-time status messages from the agent systems supplied to it from the interface means 34, historical status messages retrieved from the system's database, information from the monitoring means concerning what components (if any) of the system are currently unavailable because they are malfunctioning or inoperative, and optimization criteria and/or rules stored in the database via the administration means. Routing engine 48 uses this data to calculate the optimal way to route calls in the system by applying to this data conventional optimization algorithms and/or strategies known to those skilled in the art, including but not limited to routing the call to the highest skilled and longest available (i.e., longest inactive) agent in a workgroup. After making its decision on how best to route a particular call, generating appropriate control signals to implement this decision, and transmitting the control signals to the interface means 34 and receiving/supplying means 33, routing engine 48 instructs logger means 50 to store the real-time information presented above in the database for use in determining how to route later calls. Logger means 50, in turn, commands database manager 50 to store this information in database storage means 54. It should be appreciated that manager 52, and database storage means 54 may all be of conventional construction. Database 54 may also contain corporate and/or customer profile routing preference information for use by router 48 in determining how best to route calls through the system. Such information may include services previously or most commonly used by certain callers identified by calling line information data, personal identification numbers, etc. and may be used by the routing engine to route such calls to services most likely to be used and/or specifically tailored for use by the callers.

Figure 4:
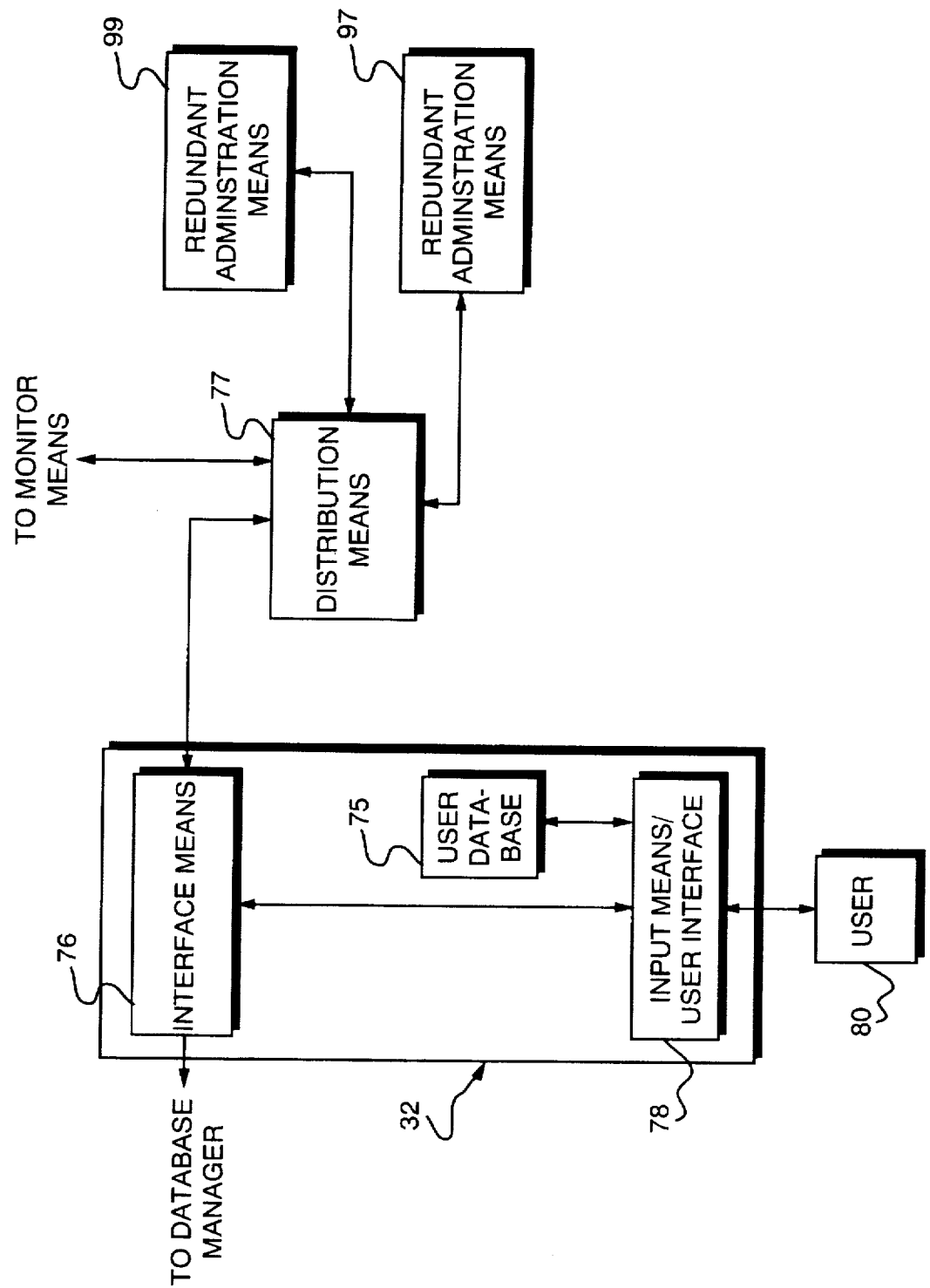
FIG. 4 is a functional block diagram of the administrative means of the preferred embodiment of FIG. 1.

FIG. 4 is a functional block diagram of administration means 32. Administration means 32 preferably comprises user input/output interface means 78 connected to central controller interface means 76. User interface means 78 preferably comprises one or more IBM-type, Intel 80486, Pentium™ or RISC-based workstations programmed to have graphical-type user interfaces for permitting users to change call routing optimization parameters, system configuration data, etc. stored in the database of the central controller. The database interface means 76 is adapted to change the user's graphically input data into a form usable by the central controller to update and/or otherwise change system information stored in the central controller's database. Administration means 32 comprises a user-accessable database means 75 for storing real-time information and configuration information and for permitting such information to be communicated to users via the user interface means 78. Also preferably, administration means 32 permits a user to monitor various system activities and current system information, such as, call routing, system configuration, etc.

Optionally, the system may comprise distribution or repeater means 77. Distribution means 77 replicates data received from the central controller and distributes the data to the administration means 32, 97, 99. Advantageously, this permits the system to comprise multiple administration means 32, 97, 99 distributed (and preferably geographically separated) throughout the system. Thus, the system may be administered from multiple geographically separated locations.

Figure 3:
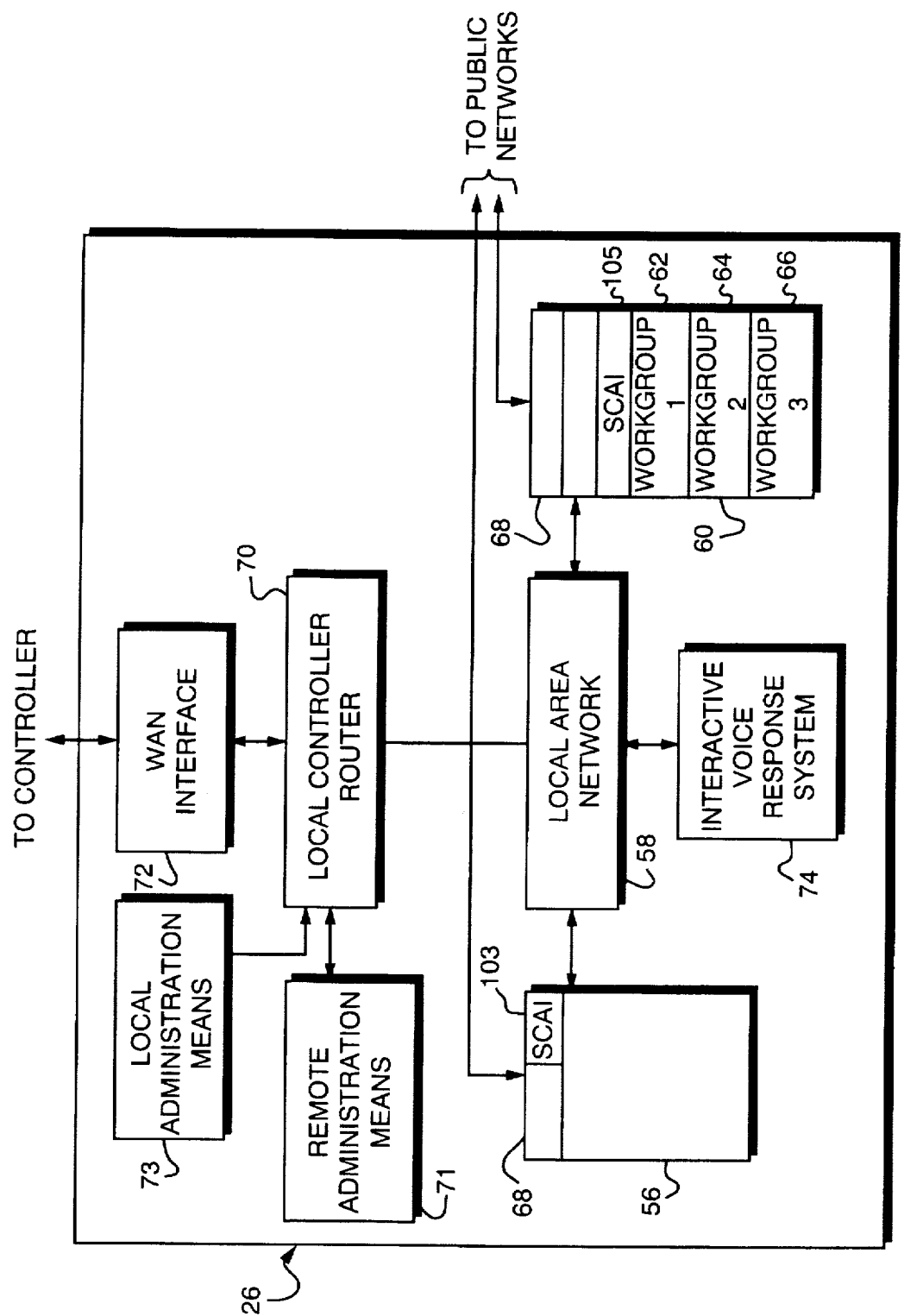
FIG. 3 is a functional block diagram of an agent system of the preferred embodiment of FIG. 1.

FIG. 3 is a functional block diagram of an agent system 26 according to this embodiment of the instant invention. Agent system 26 preferably comprises wide area network interface means 72 for interfacing the agent system's location controller/router 70 to the controller's wide area network 44, so as to permit transfer of control signals from controller 30 to local controller 70 and status messages from the local controller 70 to controller 30. In response to control signals received by local router 70 from controller 30, local router 70 issues commands to the ACD/IVR or PBX System causing the public network interfaces 68 in the ACD, PBX or IVR to connect calls received thereat from the public networks to appropriate conventional caller services (e.g., interactive voice response system 74) or individual agents (e.g., private branch exchange (PBX) 56 or ACD 60). Types of PBX's and ACD's that may be included in the agent systems of this embodiment of the instant invention include those made by the following companies: Rockwell, Aspect, AT&T, Northern Telecom, ROLM, NEC and Infoswitch. It should be noted that the particular type and number of caller services and individual agents shown in FIG. 3 are merely for illustrative purposes, and may be modified as desired without departing from this embodiment of the instant invention. Local router 70 issues commands via the conventional local network means 58 to the caller service or individual agent system to which the call is connected, as to how the individual agent or caller service is to distribute or process the call. For example, depending upon the control signals transmitted by the controller 30 to controller 70, controller 70 may instruct the call to be forwarded directly to the interactive voice response system 74 which is connected as an answering resource to ACD 60, and instruct the interactive voice response system to store information from the call for later retrieval and transmission to a workstation (not shown) connected to the PBX 56, or to connect the call to the ACD 60 and instruct the ACD to forward the call to one of the its workgroups 62, 64, 66. Of course, it will be appreciated that if appropriately modified, the interface 68 may be comprised within the public networks or may comprise a separate, stand-alone interface distinct from the agent systems. Likewise, if the PBX, IVR, and/or ACD are appropriately modified so as to include other of the various functional components of the agents (e.g., router 70), they may be eliminated as separate functional components from the agent system.

Local controller 70 also queries the individual agents and caller services for status information (i.e., whether they are active, what resources are available for use by callers, etc.), gathers this status information via the local network 58, and transmits this information to the central controller 30 via interface 72 for use in the central controller's routing decisions. In this way, the central controller 30 may automatically control routing of calls not only through the public networks, but also in the agent systems, according to status information gathered from the entire system, using global call distribution criteria. It should be understood that local router 70 is of similar construction to control signal generator means 36, except that local router 70 is adapted to control distribution of call only within its agent system and in accordance with routing commands issued by the central controller 30.

Agent system 26 may also comprise local administration means 73 for permitting user control of the local router 70, and remote administration means 71 for permitting remote control of central controller 30. Both administration means 73, 71 are of similar construction to administration means 32. Local administration means 73 may be adapted so as to be limited in its control of local router 70 only to matters not being controlled by central controller 30. Likewise, remote administration means 71 may be limited in its authority over system 10 such that administration means 32 may override commands issued by administration means 71.

Figure 5:
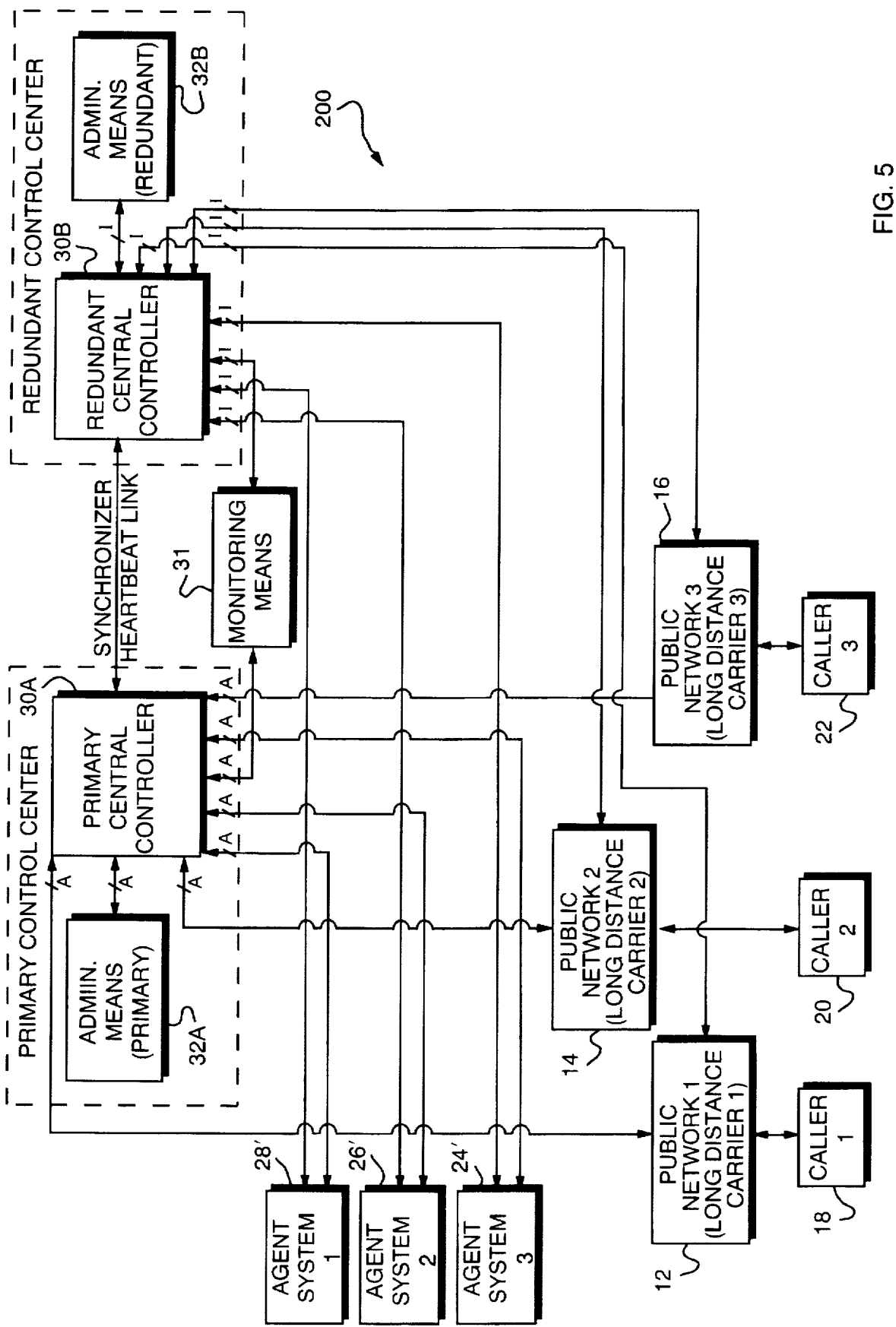
FIG. 5 is functional block diagram of another preferred embodiment of the present invention, in which Figure the interconnection lines between the public networks and the agent systems have been omitted for purposes of clarity, but should be understood to exist nonetheless.
Figure 6A:
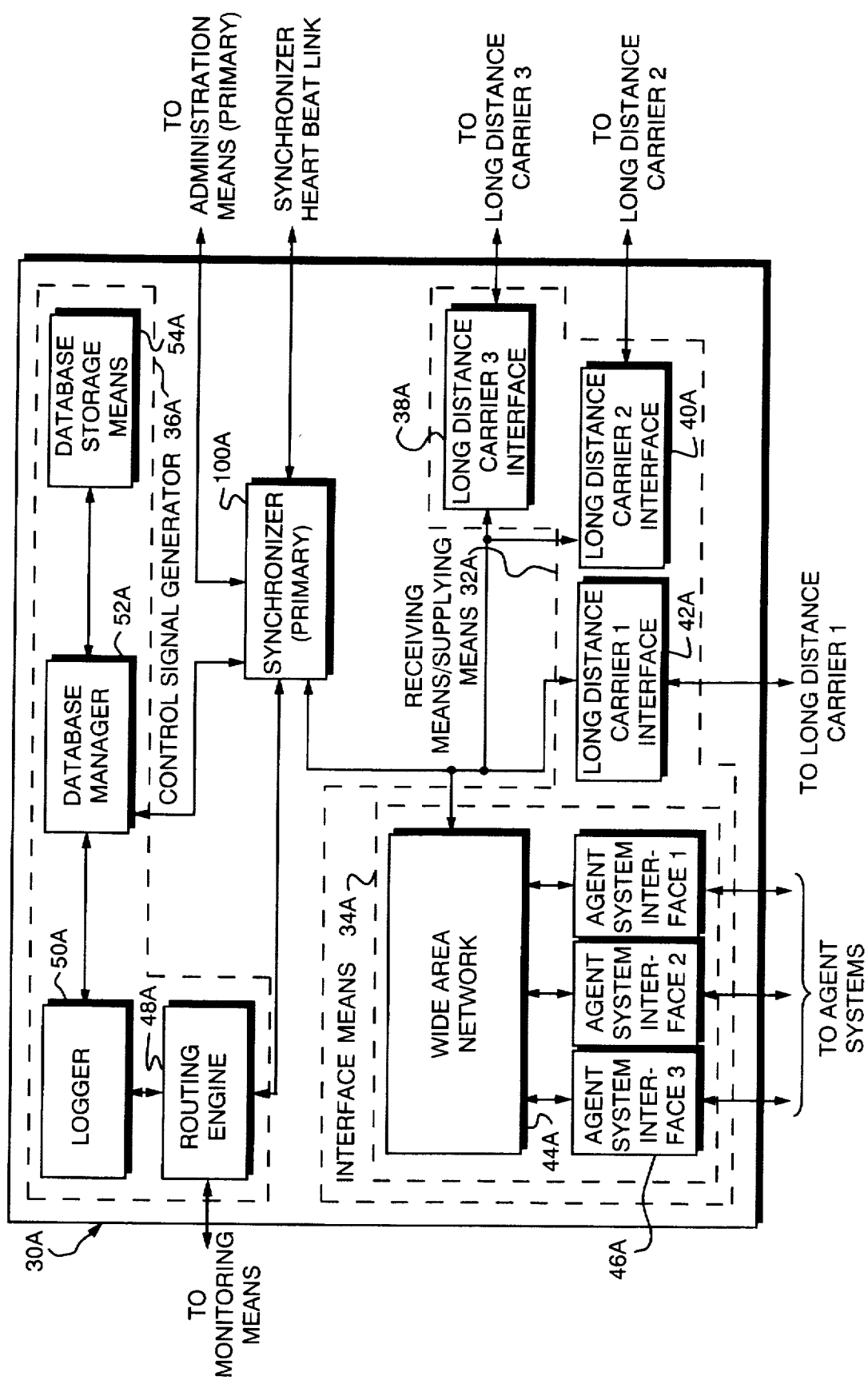
FIG. 6A is a functional block diagram of the primary central controller of the preferred embodiment of FIG. 5.
Figure 6B:
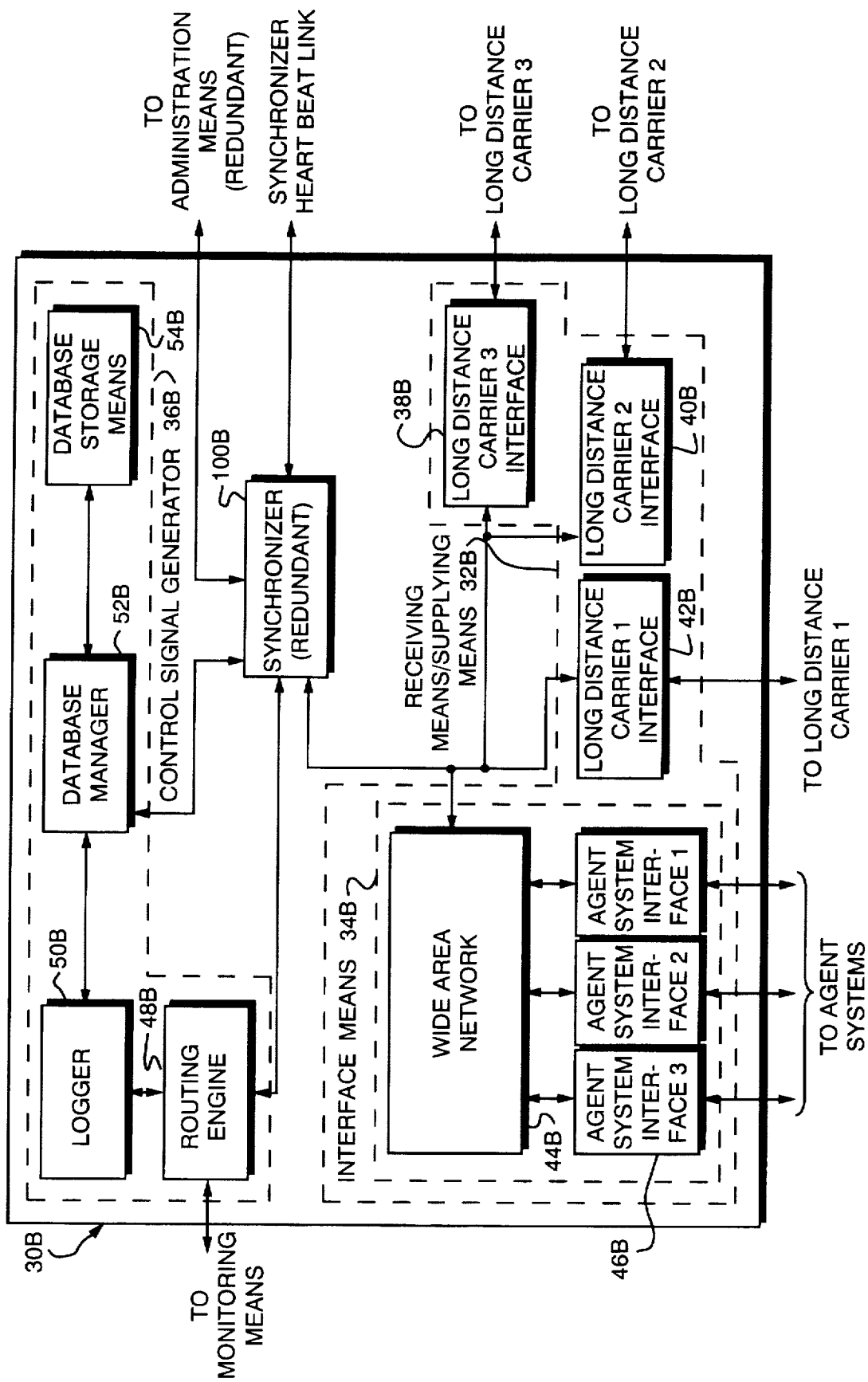
FIG. 6B is functional block diagram of the redundant central controller of the embodiment of FIG. 5.

FIG. 5 is an architectural-level block diagram of another preferred embodiment 200 of the system of the instant invention. Unless otherwise stated, the functional components and operation of the system 200 are substantially similar to those of system 10. System 200 includes at least one 24', and preferably a plurality of agent systems 24', 26', 28' connected to a primary central controller 30A and a redundant central controller 30B, and at least one 12, and preferably a plurality of conventional public telephone and/or long distance carrier networks 12, 14, 16. Callers 18, 20, 22 place calls to the agent systems 24', 26', 28' via public networks 12, 14, 16 which, although not shown explicitly in FIG. 5 as being connected to the agent systems, are in fact so connected. The central controllers 30A, 30B are connected to monitoring means 31'. Central controllers 30A, 30B are connected to each other by a synchronizer link (which preferably comprises a suitable wide area network connection means), the purpose of which will be described more fully below. Also, for reasons that will become apparent below, primary central controller 30A and administration means 32A are physically located at a primary control center. Likewise, redundant central controller 30B and administration means 32B are physically located at a redundant control center. The redundant control center and the primary control center may be geographically separated from each other. For purposes of the following discussion, connections made from the primary central controller 30A to the other components of system 200 are designed as active (i.e., with the letter "A"), while connections made from the redundant controller 30B are designated inactive (i.e., with the letter "I").

With reference now being made specifically to FIGS. 5, 6A, 6B, 7, and 8, the operation of the primary and redundant controllers 30A, 30B in system 200 will now be discussed. Advantageously, use of primary and redundant controllers in system 200 permit system 200 to exhibit a high-degree of fault-tolerance and help prevent catastrophic system failures.

In order to add fault-tolerance to the system 200, all critical functions of the system are duplicated on geographically-separated controllers 30A, 30B, which are connected in parallel to various other components of the system 200. As is known to those skilled in the art, two basic approaches exist to achieve fault-tolerance through duplication of system functions: the "hot-standby approach" and the "synchronized execution approach." In the hot-standby approach, one set of redundant functions is termed the "primary" functions, while the other set is termed the "backup" or "redundant" functions. Under normal conditions (i.e., in the absence of a failure condition), the primary functions perform the system's tasks while the redundant functions are idle. In the synchronized approach, neither the primary nor the redundant functions are idle under normal conditions, they both operate simultaneously to process duplicate inputs and produce duplicate outputs. System 200 utilizes both approaches.

At any given time one synchronizer is enabled (or "master") while the other synchronizer is disabled (or "slave"). In the system 200, synchronizer 100A of primary controller 30A is enabled, while synchronizer 100B of redundant controller 30B is disabled. The enabled synchronizer 100A is responsible for determining the order of data provided to the routers 48A, 48B of the central controllers 30A, 30B, respectively, and transmitted therefrom. This is necessary so as to virtually synchronize the internal states of the routers in both central controllers, so as to permit the redundant central controller to take over control functions in the system should the primary central controller fail. As used herein, "virtual synchronization" is intended to mean that the control signal generating means of both central controllers receive and process status messages and service requests in the same order, and both central controllers transmit control signals in the same order. It is unlikely that the synchronizers produce actual synchronization (rather than virtual synchronization), due to the time delays and differences between the two controllers of transmission of status messages, service requests, and control signals resulting from their geographical separation.

All data being sent to the routers pass through the synchronizers. Each synchronizer forwards arriving data to the other synchronizer via the synchronizer link. The enabled synchronizer transmits ordering messages to the disabled synchronizer via this link to permit the disabled synchronizer to place the data in appropriate sequence. Ordering of data transmissions to the routers is determined by the enabled synchronizer according to the interleaving of the arriving messages. Once ordering has been determined by the enabled synchronizer and confirmed, the synchronizers transmit the properly ordered data to their respective routing engines.

In addition to virtually synchronizing operation of the two controllers, the sychronizers also determine when failure of a central controller has occurred, in order to permit control functions for the system 200 to be switched to the operational controller (i.e., the one that has not failed). The synchronizers do this by sending "heartbeat" messages to each other across the synchronizer link at predetermined time intervals, in order to determine whether they are both still functioning properly. If heartbeat messages from one of the synchronizers stops being received by the other, there are two possible reasons for this phenomenon. The first possibility is that the synchronizer not sending the messages may have failed (along with its central controller). The second possibility is that the synchronizer link connection has failed.

In either event, the disabled synchronizer generates appropriate control signals and causes them to be transmitted to the agent systems. These control signals command the agent systems to send query messages to the primary central controller. If the primary central is functioning properly, the primary central controller acknowledges this by sending an appropriate reply message to the agent systems, which then transmit this reply to the disabled synchronizer. The disabled synchronizer then periodically attempts to re-establish communications with the enabled synchronizer, periodically retests the proper functioning of the other controller, and/or signals appropriate personnel via the administration means that a problem may exist with the heatbeat line.

If the majority of agent systems report that the enabled synchronizer is not functioning, then the disabled synchronizer becomes enabled, and commands the agent systems and public networks to switch from being controlled by the primary controller to being controlled by the redundant controller. The newly enabled synchronizer then periodically attempts to re-establish communications with the other synchronizer, periodically retests the proper functioning of the other controller, and/or signals appropriate personnel via the administration means that a problem exists with the other controller.

Once the failed sychronizer has recovered, it initializes by default as the disabled synchronizer. It re-establishes communication with the enabled synchronizer, synchronizes the internal states of the generating means of the now redundant controller and begins normal functioning as the disabled synchronizer.

If the disabled synchronizer is found to have failed, the enabled synchronizer continues normal operation, periodically attempts to re-establish communication with the failed synchronizer, and attempts to notify appropriate personnel of the failure. Once the failed synchronizer has recovered, it initializes by default as the disabled synchronizer. It re-establishes communication with the enabled synchronizer, synchronizes the internal states of the generating means of the redundant controller and begins normal functioning as the disabled synchronizer.

Figure 7:
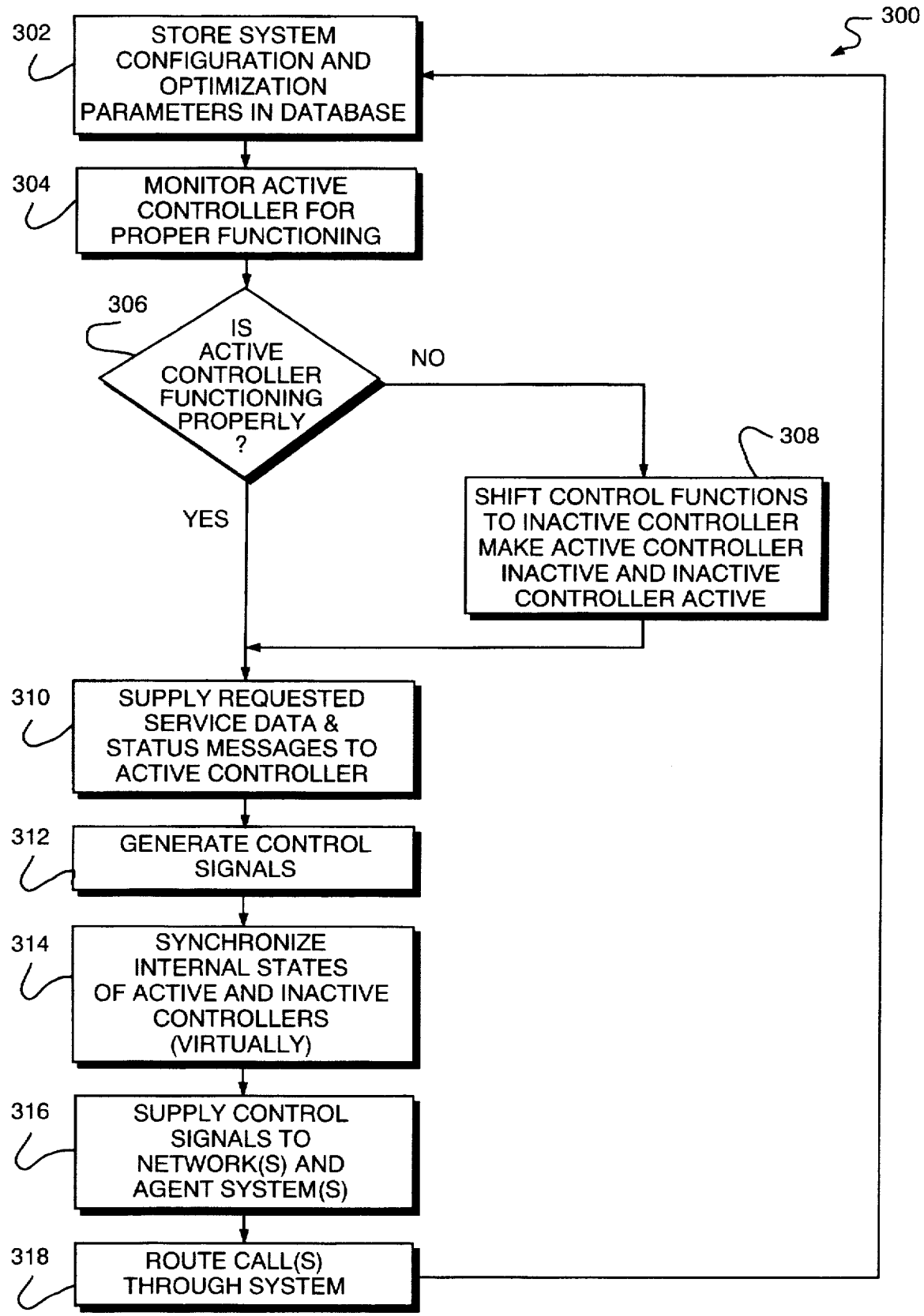
FIG. 7 is a flowchart illustrating the operational flow of the preferred embodiment of FIG. 5.

At its most basic level, operation as shown in FIG. 7 which is a flow chart 300 illustrating the operational flow of System 200, of system 200 begins by storing system configuration data, optimization parameters, and other system information in the databases of the central controllers (block 302). The synchronizers monitor whether the two controllers are functioning properly, as shown at block 304, in the manner discussed previously. Additionally, the monitoring means monitors proper functioning of the system 200 and informs the controllers as to any change in operation of the system. If it is determined that the active (i.e., primary) controller is not functioning properly (block 306), control of the system is shifted essentially seamlessly (from the point of view of the system) to the redundant controller (block 308). Otherwise, the primary controller receives requested service data and status messages from the public networks and agent systems at block 310 and generates control signals for routing the call through the system (as shown at block 312). The synchronizers virtually synchronize the internal states of the two controllers (as shown at block 314). The control signals are supplied to the public networks and the agent systems to route calls through the system (as shown at block 316 and 318, respectively, of FIG. 7). This process then repeats itself as newly acquired system information is stored in the databases.

Figure 8:
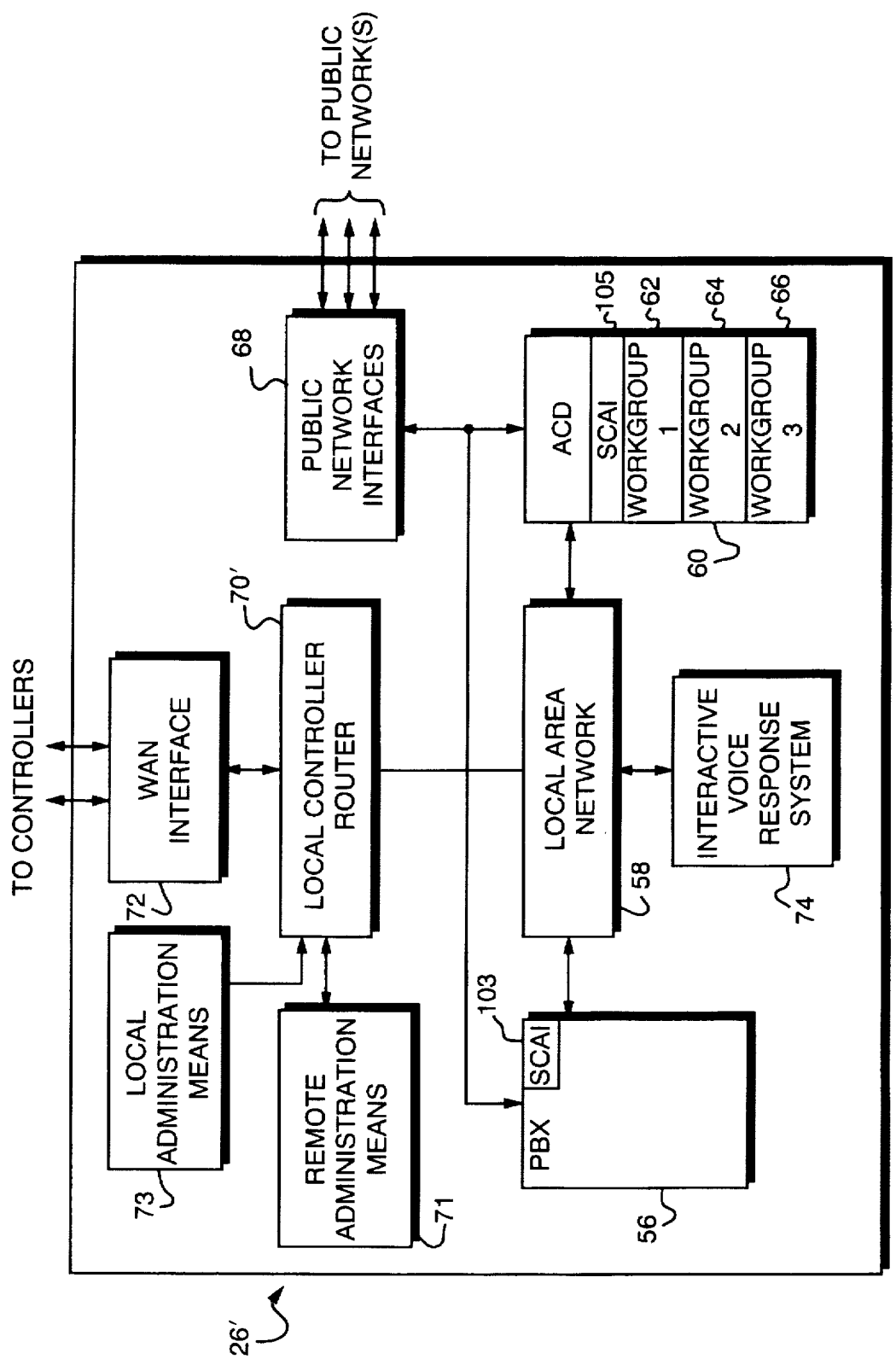
FIG. 8 is a functional block diagram of an agent system of the preferred embodiment of FIG. 5.

FIG. 8 is a functional block diagram of an agent system 26' according to this embodiment 200 of the system of the instant invention. Its elements and operation are essentially the same as those of agent system 26 of the first embodiment 10. Additionally, however, agent system 26' includes connections from WAN interface 72 to the two controllers 30A, 30B, respectively. Also, to accommodate the differences in operation of the system 200 that result from use of a redundant central controller, the local controller 70' is adapted to only act on control signals from the enabled central controller. In other words, any control signal from the redundant controller 30B (unless the redundant controller 30B assumes control of the system 200 due to failure of the primary controller 30A, and transmits the appropriate switching signal to the agent system 26') will be ignored by the agent system 26'. However, if the local controller 70' is appropriately commanded to accept commands from the redundant controller 30B, then the local controller 70' will no longer act upon control signals originating from the primary central controller 30A, until appropriately signalled to do otherwise. Likewise, although not shown, the public network interfaces are appropriately adapted such that they will not act on commands issued by the redundant controller unless appropriate commands are issued to do so, in which case, commands from the other controller will be ignored.

Thus, it is evident that there has been provided a communications system and method for operating same that fully satisfy both the aims and objectives hereinbefore set forth. It will be appreciated that although specific embodiments and methods of use have been presented, many modications, alternatives, and equivalents will be apparent to those skilled in the art. For example, preferably, the above-presented functional components (with the exception of the public networks 12, 14, 16) of the preferred embodiments of the system of the present invention are embodied as one or more distributed computer program processes running on one or more conventional general purpose computers networked together by conventional computer networking means. Most preferably, each of these functional components is embodied by running distributed computer program processes on IBM-type, Intel 80486, Pentium™ or RISC microprocessor-based personal computers networked together by conventional networking means and including such additional conventional computer and telephonic communications hardware (e.g., modems) and software as is appropriate to enable performance of the stated function. Also, preferably, these personal computers run the Microsoft Windows™, Windows NT™, or DOS™ operating systems. However, the various functional components of the embodiments of the system of the present invention may alternatively be constructed solely out of custom, dedicated electronic hardware and software, without departing from the present invention. Further alternatively, rather than use IBM-type PC's, the system may instead utilize SUN™ and/or conventional RISC-based workstations.

Many other modifications are also possible. For example, although the monitoring means 31, 31' of the two embodiments 10, 200 of the system of the present invention may be thought of in a functional sense as comprising a single, centralized process, it may also comprise a plurality of distributed computer processes (not shown), at least one of which is located at each agent system 24, 26, 28, 24', 26', and 28', central controller 30, 30A, 30B, and administration means 32, for monitoring the functioning of the functional components of the systems 10, 200. In either case, the monitoring means monitors proper functioning of the components of the system by systematically receiving from the components status messages via monitor repeaters or distributors (similar in function to the distributor means 77) which copy the messages and distribute them to the monitoring means. The functional components intended to be monitored by the monitoring means are programmed to periodic status messages which are gathered by the monitor distributors and transmitted to the monitoring means. The monitoring means then may determine if the system behavior is within bounds and notify attendant personnel and/or initiate diagnostics on the failed system.

Further alternatively, although the agent systems 26, 26' shown in FIGS. 3 and 8 utilize a local controller 70 or 71' to control distribution of calls within individual PBX 56 and ACD 60, if PBX 56 and/or ACD 60 are equipped with conventional Switch to Computer Applications Interface (SCAI) means 103 and 105, the primary central controller 30, 30A may be used to directly control distribution of calls within the systems so equipped. In such an agent system, when a call is to be routed in a PBX 56 or ACD 60 equipped with SCAI means, the primary central controller transmits appropriate control signals for controlling a system equipped with SCAI means to the local controller 70, 70' which has been modified to permit transmission of these signals directly to the local area network 58 to the SCAI means of the PBX or ACD to be controlled. The PBX or ACD equipped with SCAI means may thus be controlled essentially directly by the primary central controller. It will be appreciated that although SCAI means 103, 105 are shown in FIGS. 3 and 8, means 103, 105 may instead be of any industry standard proprietary type, or may be adapted to utilize some other type of conventional industry standard control protocol.

Other modifications are also possible. For example, although the foregoing description has proceeded upon the assumption that calls are routed from outside the public networks to the agent systems, if appropriately modified in ways apparent to those skilled in the art, the system may also permit and control routing of calls from the agent systems through the public network to outside call receivers.

Additionally, although in the preferred embodiments of the system of the present invention, only the central controller is made redundant, other functional elements may also be made redundant by modifying them in ways apparent to those skilled in the art and/or utilizing the fault-tolerance principles discussed above. Advantageously, this permits even greater system-wide fault-tolerance to be obtained.

Further alternatively, the various functional components of the system 10, 200 may be programmed or otherwise adapted to permit third-party intra-system call routing or forwarding. For example, in the event that a workgroup to which a caller wishes to be connected by the system is busy or otherwise unable to accept the call at the time requested, the central controller may be programmed to forward the call to an interactive voice response (IVR) system (within the agent system or stand-alone), and to record appropriate data to enable the central controller to later connect the IVR to the workgroup to which connection was initially desired. The IVR may then prompt the caller to furnish appropriate information for later processing of the call (e.g., purpose of call, caller's name, telephone number, etc.). When the workgroup becomes available, the central controller connects the IVR to the workgroup, and commands the IVR to transmit the information stored from the caller to the workgroup via the public network. The members of the workgroup may then undertake further action, such as placing a call to the caller.

Alternatively, upon notifying the caller that the workgroup is busy, the central controller or IVR may prompt the user to indicate whether the caller wishes to be called back by the workgroup. If the caller indicates that such is desirable, the central controller may record this and other information useful for later processing of the call, and terminate the call. Once the workgroup again becomes available, the central controller may then telephone the caller through the public network, prompt the caller when the caller wishes to be connected to the workgroup, and connect the caller to the workgroup.

Additionally, if appropriately modified at least one of the public networks may be replaced by a private network suitable for being controlled by the central controllers.

In yet another modification, the system may be adapted to permit so-called "translation routing" using a conventional DNIS-number routing scheme. In such an appropriately modified system, the system directs the public interexchange carrier to route the call to a specific agent system using a specific DNIS number. When that call arrives at the agent system, the local router is adapted to direct the connection of the call to the desired service. As will be appreciated, the desired service may have been selected by the caller entering an account number, personal ID number, or other type of direction information in response to a network-generated caller prompt.

Further alternatively, the system may be adapted to permit caller and/or workgroup call routing by permitting the caller and/or workgroup to enter a desired termination extension and then optimally routing the call to that extension.

Other modifications may also be possible. Accordingly, the present invention is intended to cover all such alternatives, modifications, and equivalents as may be included within the spirit and broad scope of the invention as defined only by the hereinafter appended claims.

Thus, advantageously, the present invention permits automatic telephone routing decisions to be made with "global authority" based upon information gathered in real time from the entire communications system. The present invention permits unified central control and management for the entire system. The present invention also uses a distributed client/server network structure that enables efficient use and transmission of system data, as well as, fault tolerance through replicated system functions. A system-wide distributed diagnostic monitoring and servicing network permits reaction to and recovery from system component failure in real time. None of these features of the present invention are disclosed anywhere in the prior art.

What is claimed is:

1. A communications system, and comprising, at least one network for connecting a call to at least one agent system, said agent system including a plurality of workgroups, and being controlled by control signals supplied to said agent system, and a primary central controller for generating control signals for being supplied to said network and said agent system to control said network and said agent system so as to optimally route said call to a workgroup of said agent system, said central controller being adapted to generate said control signals for controlling said network and said agent system based upon status messages received from said agent system, requested service data from said network, and optimization parameters stored within said central controller.

2. A communications system according to claim 1, wherein said network comprises a plurality of different long distance carriers and said central controller comprises means for interfacing to said different carriers whereby to supply pertinent control signals to said different carriers.

3. A communications system according to claim 1, wherein said agent system includes an automatic call distribution (ACD) system having a plurality of workgroups and said control signals permit said call to be optimally routed to one of said workgroups of said ACD system.

4. A communications system according to claim 1, wherein said agent system comprises an interactive voice response system and said control signals permit said call to be optimally routed to said interactive voice response system.

5. A communications system according to claim 1, wherein said agent system comprises a private branch exchange system having a plurality of workgroups and said control signals permit said call to be optimally routed to one of said workgroups.

6. A communications system according to claim 1, wherein said requested service data comprises a telephone number.

7. A communications system according to claim 1, wherein said control signals are adapted to permit call load among said agent systems to be balanced.

8. A communications system according to claim 1, wherein said control signals are adapted to permit cost of operating said communications system to be minimized.

9. A communications system according to claim 1, wherein said control signals are adapted to permit call distribution to the longest available agent.

10. A system according to claim 1, and further comprising, a redundant controller for controlling said system in event of malfunctioning of said primary controller, and means for virtually synchronizing receipt of status messages and service data by said controllers.

11. A system according to claim 1, wherein said agent system comprises a conventional Switch-To-Computer-Applications Interface (SCAI) for permitting said primary central controller to control distribution of calls in said agent system.

12. A system according to claim 1, wherein said control signals include translation routing messages for aiding in routing said call through said system.

13. A system according to claim 1, wherein said network is a private network.

14. A system according to claim 1, wherein said routing is also based upon a desired termination supplied to said system.

15. A system according to claim 1, wherein said requested service data comprises calling line identification data.

16. A system according to claim 1, wherein said requested service data comprises a sequence of digits entered by a caller.

17. A system according to claim 1, wherein said controller generates said control signals based upon, at least in part, caller-entered digits.

18. A system according to claim 1, wherein said agent system includes a control interface for permitting control of said agent system by said central controller.

19. A communications system according to claim 1, wherein said network comprises at least one long distance carrier.

20. A communications system according to claim 19, wherein said long distance carrier comprises a SS7 long distance control network and said central controller comprises means for interfacing to said control network.

21. A communications system according to claim 1, and further comprising, means for interfacing said central controller with a plurality of agent systems.

22. A communications system according to claim 21, wherein said central controller also comprises wide area network means.

23. A communications system according to claim 1, wherein said central controller comprises routing means for generating control signals for controlling said at least one agent system based upon said status messages, said service data, and said optimization parameters, said routing means comprising database means for dynamically storing, updating, and retrieving said status messages, service data, and optimization parameters.

24. A communications system according to claim 23, and further comprising, administration means for permitting a user to control operation of said system.

25. A communications system according to claim 24, wherein said administration means comprises means for inputting said optimization parameters.

26. A communications system according to claim 1, and further comprising, a redundant central controller for controlling said system in event of failure of said primary central controller.

27. A communications system according to claim 26, wherein said redundant central controller is geographically remote from said primary central controller.

28. A communications system according to claim 26, and further comprising means for synchronizing respective internal states of said primary and redundant central controllers to permit said redundant central controller to essentially seamlessly begin controlling said system upon failure of said primary controller.

29. A communications system according to claim 1, and further comprising monitoring means for monitoring operation of said system.

30. A communications system according to claim 29, wherein said central controller includes means for logging system information to a database.

31. A communications system according to claim 1, wherein said agent systems are connected to said central controller via wide area network means.

32. A communications system according to claim 31, wherein said wide area network means comprises Transmission Control Protocol/Internet Protocol means.

33. A system according to claim 1, wherein said agent system also includes at least one caller service and said primary central controller is also for generating control signals for optimally routing said call to said caller service.

34. A system according to claim 33, wherein said caller service comprises an interactive voice response system.

35. A system according to claim 1, wherein said agent system also includes a local controller for routing said call through said agent system in response to said control signals.

36. A system according to claim 35, wherein said local controller is connected to said primary central controller via a wide area network.

37. A call-forwarding method for use in the system of claim 1, and comprising the steps of:
  a. supplying said controller with data related to said call and representative of a desired forwarding termination for said call;
  b. generating in said controller additional control signals for causing said network and said agent system to connect said call to said desired termination; and
  c. supplying said additional control signals to said network and said agent system to cause said network and said agent system to connect said call to said desired termination, thereby forwarding said call to said desired forwarding termination.

38. A call-forwarding method according to claim 37, wherein said desired termination comprises an interactive voice response unit for recording information from said call.

39. A system according to claim 1, and further comprising, means for distributing information concerning said system to a plurality of means for administering said system.

40. A system according to claim 39, wherein said distribution means also gathers information concerning said system for use by said monitoring means.

41. A communications system, and comprising:
  a. a plurality of public networks for connecting a plurality of calls to a plurality of respective agent systems in response to control signals supplied to said public networks, each of said agent systems including a plurality of workgroups;
  b. at least two central controllers for generating control signals for being supplied to said public networks and said agent systems to control said public networks and said agent systems so as to optimally route said calls through said networks and said agent systems to certain of said workgroups, said central controllers being adapted to generate said control signals based upon status messages received from said agent systems, requested service data from said networks, and optimization parameters stored within said central controllers, said central controllers including a primary central controller and a redundant central controller, said redundant central controller being for controlling said system in event of failure of said primary central controller, said central controllers being geographically separated from each other;
  c. synchronizer means for virtually synchronizing respective internal states of said central controllers;
  d. interfacing means for interfacing said central controllers to said public networks whereby to permit supply of control signals to each of said public networks; and
  e. means for interfacing said central controllers to said plurality of agent systems.

42. A communications system according to claim 41, and further comprising, monitoring means for monitoring operation of said system.

43. A communications system according to claim 41, and further comprising, administration means for permitting a user to control operation of said communications system.

44. A communications system according to claim 43, wherein said administration means permits input of said optimization parameters.

45. A communications system according to claim 43, wherein said means for interfacing said central controllers to said plurality of agent systems comprises wide area network means.

46. A communications system according to claim 45, wherein said central controllers each comprise database means for storing and retrieving said status messages, requested service data, and optimization parameters.

47. A communications system, and comprising:
  a. a public network for connecting a plurality of calls to a plurality of agent systems based upon control signals supplied to said public network, said agent systems being controlled by control signals supplied to said agent systems;
  b. a primary central controller for controlling said communications system during normal operation thereof, said controller having means for receiving status messages from said agent systems and requested service data from said network, said controller also having means for generating and supplying said control signals to said network and said agent systems whereby to control said public network and said agent systems so as to optimally route said calls through said public networks to said agent systems; and
  c. a redundant controller for controlling said communications system in event of failure of said primary controller, said redundant controller including means for permitting shifting of control functions from said primary controller to said redundant controller upon said failure of said primary controller.

48. A method for optimally routing a call through a communications system having at least one public network for connecting said call to a workgroup of an agent system based upon control signals supplied to said public network and said agent system, said workgroup being one of a plurality of workgroups, said method comprising the steps of:
  a. transmitting requested service data from said network to a central controller;
  b. transmitting status messages from said agent system to said controller;
  c. generating in said controller control signal for controlling said network and said agent system in response to said requested service data, said status messages and a set of optimization parameters stored within said controller; and
  d. supplying said control signals from said controller to said network and said agent system whereby to control said network and said agent system so as to optimally route said call through said network to said workgroup.

49. A method according to claim 48, and further comprising, monitoring whether said controller is functioning properly whereby to determine whether a failure condition of said controller exists.

50. A communications system according to claim 48, and further comprising, means for checking operation of said controller whereby to ascertain whether said central controller is functioning properly.

51. A method according to claim 48, and further comprising, interfacing a user to said system whereby to permit said user to administer said system.

52. A method according to claim 48, and further comprising, synchronizing respective internal states of said central controller and a redundant controller for controlling said system in event of failure of said central controller.

53. A method according to claim 52, and further comprising, geographically separating said central and redundant controllers.

54. A method according to claim 52, wherein said synchronization is virtual.

55. A method according to claim 48, and further comprising, storing said requested service data, said status messages, and said set of optimization parameters in a database.

56. A method according to claim 55, and further comprising, storing system configuration information in said database.

57. A method according to claim 56, and further comprising, automatically updating entries in said database when said entries change.

58. A method according to claim 55, wherein said parameters including call routing parameters.

59. A method according to claim 48, and further comprising, monitoring elements of said system whereby to determine whether said elements are functioning properly.

60. A method according to claim 59, wherein said monitoring comprises periodically querying said elements for proper response.

61. A communications system, and comprising, at least one network for connecting a call to at least one caller service, a primary central controller for generating control signals for supply to said network and said at least one caller service to control said network and said at least one caller service so as to optimally route said call to said at least one caller service, said central controller being adapted to generate said control signals for controlling said network and said at least one caller service based upon status messages received from said at least one caller service, requested service data from said network, and optimization parameters stored within said central controller.

62. A system according to claim 61, wherein said central controller is also adapted to generate said control signals based upon status messages received from at least one agent system.

63. A system according to claim 61, wherein said at least one caller service comprises a stand-alone interactive voice response system.

64. A system according to claim 61, wherein said at least one caller service comprises an interactive voice response system (IVR) and the control signals generated by said central controller cause said IVR to record appropriate data from said call for facilitating a transaction with an individual making said call.

65. A system according to claim 61, wherein said at least one caller service comprises an interactive voice response system for recording data from said call for facilitating a transaction with an individual making said call.

66. A system according to claim 61, wherein said network is a private network.

67. A method for controlling a communications system including at least one network for connecting a call to an interactive voice response system (IVR), a primary central controller for generating control signals for supply to said network and said IVR to control said network and said IVR so as to optimally route said call to said IVR, said central controller being adapted to generate said control signals for controlling said network and said at least one caller service based upon status messages received from said IVR, requested service data from said network, and optimization parameters stored within said central controller, said method comprising the steps of:

a. transmitting to said network control signals generated in said central controller for causing said network to interconnect said call and said IVR; and b. transmitting to said IVR control signals generated in said central controller for causing said IVR to record data from said call for facilitating a transaction with an individual making said call.

68. A method according to claim 67, wherein said system further comprises at least one agent system and said method further comprises transmitting to said network control signals generated in said central controller using data recorded from said call for causing said call to be connected to said at least one agent system after having been connected to said IVR.

69. A method according to claim 67, wherein said network is a private network.

70. A system according to claim 67, wherein said data is for permitting a workgroup to undertake further action concerning said call and said method further comprises transmitting to said IVR control signals generated in said controller for causing said IVR to transmit at least a portion of said data to said workgroup.

71. A method according to claim 67, wherein said system also comprises at least one agent system, said call is placed by a caller, and said method further comprises terminating said call and using data recorded from said call to generate control signals in said central controller for causing said network to automatically initiate connecting of another call from said caller to said agent system.

72. A method according to claim 71, said method further comprising, prior to connecting said another call from said caller to said agent system, prompting said caller to indicate whether said caller wishes to be connected to said agent system.

* * * * *